Sept. 6, 1938.  W. DUPERRON  2,129,204

ELECTRICAL MEASURING INSTRUMENT

Filed April 17, 1936

INVENTOR
Wilfred Duperron

Patented Sept. 6, 1938

2,129,204

UNITED STATES PATENT OFFICE 2,129,204

ELECTRICAL MEASURING INSTRUMENT

Wilfred Duperron, Vancouver, British Columbia, Canada

Application April 17, 1936, Serial No. 74,968

10 Claims. (Cl. 175—183)

This invention relates to electrical measuring instruments and more particularly to a tester for accurately and fully determining the conditions of condensers and transformers such as are used in ignition systems and similar electrical apparatus.

The primary object of this invention, as regards the testing of condensers, is to provide an instrument which will indicate the capacity of static or plate type condensers by impressing thereon a sharply damped wave, intermittent current through a meter connected in parallel with another condenser, the use of this current rendering possible an audio-test for corrosion, and enabling, by the use of a rectifier and neon lamp, a reliable test for any pure conduction current flowing through the condenser resulting from the lack of perfect insulation or leakage.

And the primary object of this invention, as regards the testing of transformers, is to more accurately test the same and determine the character and location of any hidden defects by introducing a similar current of high voltage into the high tension coil of the transformer, thus testing this coil directly for leakage, insulation or gaps, then connecting or shorting the low tension coil of the same transformer through a second meter, noting the comparative readings, thus accurately diagnosing any defects in the transformer by indicating leakage, open circuits or shorted turns and whether these defects occur in the primary or secondary windings, as well as the operating efficiency under conditions approximating those conditions under which these units are generally used.

Further objects of my invention are to provide a tester which can be used by moderately skilled persons without danger of damaging the units tested as is often done with other existing testers and to provide a tester which can be made easily portable and which can be used on a line carrying a current with a pressure of 110 volts or, alternatively, can be operated by a six volt battery, the complete unit being inexpensive to manufacture and simple to operate.

It is worthy of especial note that my tester is automatically self-testing against inherent defects.

I attain these and other objects by a novel arrangement of apparatus illustrated in the accompanying drawing, in which.

Figure 1:
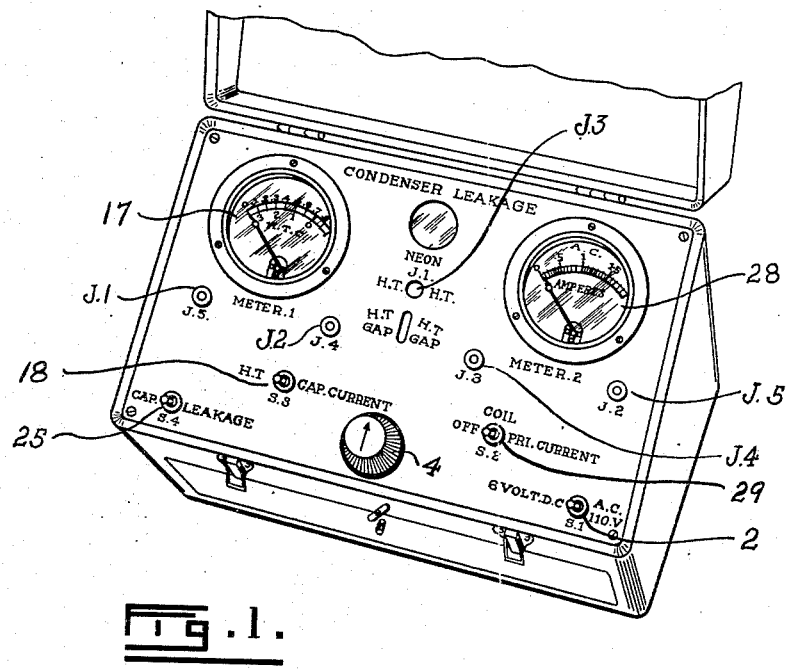
Figure 1 is a view of the assembled tester as manufactured.
Figure 2:
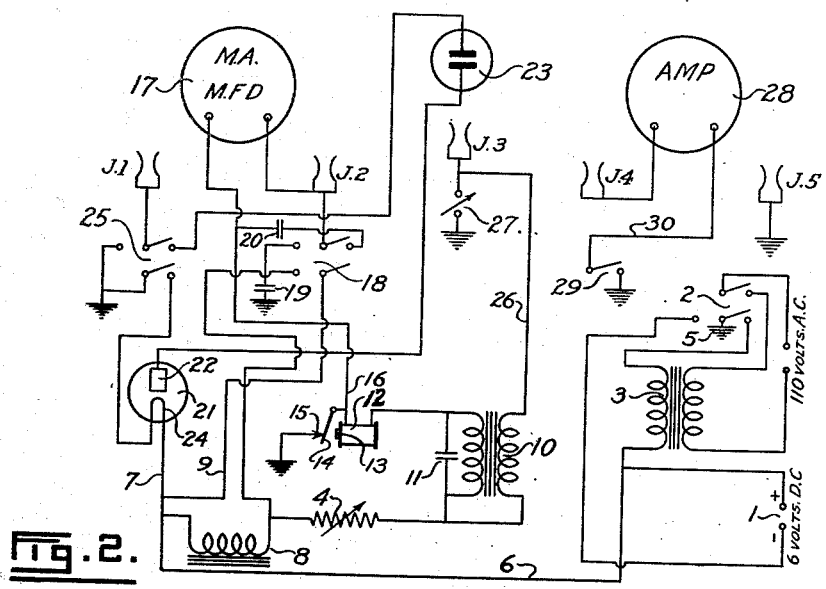
Figure 2 is a diagrammatical sketch of the circuit of the tester illustrated in Figure 1.

In this drawing I have shown two meters although one meter only is necessary provided the extra required switches and extra calibration on this meter be added but for ultimate simplicity of operation the second meter is to be preferred.

Similar numerals and letters refer to similar or identical parts throughout the two different views.

My tester may be operated on either direct or alternating current as I have indicated by the connections made to the six volt battery 1, the double pole, double throw, toggle switch 2 and the step-down transformer 3 which may be connected across any 110 volt source.

It will be noted that the common ground 5 forms a part of the circuit and the single wire 6 leads the current from either of these sources into the tester proper, the voltage in both cases being the same, six volts, variations in the current sources being compensated for by adjustment of the variable resistance 4.

From this single wire 6 current is tapped to flow into the lead 7 and either through the choke coil 8 for condenser testing or through the choke coil shunt 9 for transformer testing into the primary winding of the transformer 10. The transformer 10 has a condenser 11 shunted across it and the interrupter or make and break unit may be incorporated with this transformer or, as I have shown in the drawing, a separate coil 12 with a suitable core 13 may be used to operate the armature 14 which I have shown connected in series with the primary winding.

The other breaker point 15 is grounded and the lead 16 is connected to the meter 17 which is calibrated to read capacity in microfarads, or in this case tenths of a microfarad, and also to read amperes on a reversed scale. The other lead of this meter is connected to a double throw double pole toggle switch 18 and I prefer to use this type of switch or its equivalent since its use greatly simplifies the operation of the instrument.

Having further reference to the drawing it will now be apparent that this switch may be made to connect the grounded blocking condenser 19 in series with the meter 17 or, alternatively, to connect the meter in parallel with the condenser 20 and it will also be noted that, due to the toggle construction of the switch, the choke 8 is shorted out of this circuit when the blocking condenser 19 is placed in the circuit. If standard switches of this general type are used the single unused pole will remain idle.

For use in condenser testing for possible leakage, insulation and charge retention I have connected a rectifier, generally indicated by the numeral 21, with its plate 22 connected in series with the neon lamp 23 and with its filament connected to the lead 7. Other types of rectifiers may, of course, be used in this circuit.

A switch 25 of the same type as switch 18 is used to control this leg of the circuit and it will be noted that this switch may be operated to connect the filament positively to ground and simultaneously to connect the plate 22 and neon lamp 23 in series with the jack J1. This jack may alternatively be connected to ground by the reverse throw of switch 25. The jack J2 is connected in the lead joining the meter 17 to the switch 18. The jack J3 is connected in the lead which joins the secondary of the transformer 10 in series with the safety spark gap 27, one pole of which is grounded. The jack J4 is connected directly to one post of the meter 28 which is an A. C. ammeter while the jack J5 is connectable to this second meter through ground and the switch 29 inserted in the lead 30 joined to the other post of this ammeter 28.

It is an important and valuable feature of my tester that the same may be easily tested against defects, that is, it is self-testing since break down of the tester at any likely part of the circuit will immediately be indicated by failure to secure proper readings on the meter 17. It is therefore good policy, especially in testing transformer coils, to connect the tester with a source of electrical energy and by adjusting the variable resistance 4 first secure a reading of zero or full deflection of the needle of the meter 17.

I shall now describe the actual operation of the tester in testing a condenser for capacity. The condenser to be tested is connected, usually by means of flexible leads, between the jacks J1 and J2, the switch 25 is thrown to the left to ground J1 and the switch 18 is pulled to the right to shunt the condenser 20 with the meter 17, while the current is turned on by means of switch 2, the meter 17 then reading the capacity of the condenser in microfarads.

In this test the electric current is led through the lead 6, choke coil 8, variable resistance 4 and the primary of the transformer 10 to the breaker points 15 and since the secondary of the transformer 10 is not shorted the effect of this unit is that of a second choke or inductance in the circuit. When these breaker points separate under the action of the magnetic core 13 there is a current of considerable voltage impressed on the meter circuit and, due to the inclusion of high inductance in the circuit, the current lags behind the voltage in phase and it is the counter current produced by the periodic make and break in a highly inductive circuit which enters the meter and the condenser under test. It should be particularly noted that current is made to flow through the meter in two directions since the breaker points on again contacting each other short the condenser to ground. The current flowing into and charging the condenser then discharging back to ground may be considered as a type of A. C. current.

The condenser 20 is always shunted with the meter 17 while this test is being made, this arrangement having been found to simplify the calibration of the meter in microfarads, making the same more uniform and also increasing the accuracy of measurement of the capacities of both large and small condensers.

It has been found that the use of a current of this special characteristic enables an audible test for corroded or otherwise imperfect connections within the condenser to be made, since under these conditions a sparking or crackling sound can be detected in the condenser under test and at the same time the meter 17 usually gives an unsteady reading.

The capacity of the condenser tested is read directly on meter 17 and varies directly as the mean of the oscillating current flowing in the lead 16 during the successive chargings and dischargings of the condenser. Too large a reading must, however, be regarded with suspicion since this may be due to shorts within the condenser and if there be no reading an open circuit is indicated.

These latter readings should be interpreted in the light of the information gained in the next part of the test which I shall now describe.

To test the condenser for leakage the switch 25 is thrown to the right, that is, the plate of the rectifier 21 and the neon lamp are placed in series with the condenser under test and the circuit of the filament 24 of the rectifier is completed to ground. Uni-directional current can now flow to the condenser while the jack J1 is not grounded and the condenser should take and hold its full charge. Therefore the neon lamp should glow only for an instant while the condenser is charging and if it continues to glow at all it indicates that the insulation resistance of the condenser is low. This low insulation resistance may be due to faulty construction, dielectric hysteresis, presence of moisture within the condenser or other defects resulting in leakage.

To test the condenser for charge retention the condenser is first fully charged as in the preceding paragraph and after a short lapse of time the power is turned off and the switch 25 is thrown over to ground the jack J1 shorting the condenser through the meter 17 which will show a deflection if the charge has been held. The longer the time that can be allowed to lapse with the meter still showing a deflection when the condenser is thus shorted the greater is the charge holding ability of the condenser.

I shall now describe how a transformer of the type commonly known as an ignition coil is tested. As before mentioned, variations in the source of power should be compensated for by adjustment of the variable resistance 4 so that the meter 17 gives a full deflection of its needle, this full deflection being indicated at zero on the milliampere scale shown in Figure 1 of the drawing, since in the following test the increase of current and fall of voltage is read directly from this scale although the units of measurement used is arbitrary.

The three posts of said transformer are then connected, by means of flexible leads, to the three jacks J3, J4, J5, the high tension winding terminal being connected to J3. The switch 18 is thrown to the left and the switch 29 is left open so that the low tension winding of the transformer under test is open circuited. The high tension winding is now in series with the high tension winding of the transformer 10.

Since no load is being drawn by the low tension winding of the transformer under test the high tension winding now included in the circuit should not materially affect the voltage across the breaker points in the circuit of the primary of the transformer 10 and the meter 17 should still show full deflection if the unit tested has its high tension winding in good order. If this reading falls materially it indicates that there is a leakage in the high tension winding to ground, otherwise the high tension current would be entirely choked out, unless there are shorted turns in either winding.

Should the meter 17 show an unsteady reading, this indicates that a gap has developed in the high tension winding.

The switch 29 when closed shorts the low tension winding of the transformer under test through the meter 28 and this part of the test is greatly simplified because the great majority of ignition coil transformers will give a standard reading of three-quarters to seven-eighths of one ampere so that a lesser reading indicates a lowered efficiency probably due to shorted turns. The simultaneous readings of the two meters must, however, be interpreted to indicate whether or not a sufficient amperage is induced to flow in the low tension winding to correspond with the number of milliamperes flowing in the high tension circuit.

In this connection it should be stated that charts showing proper efficiency readings for different electrical units to be tested are supplied with the instrument.

The meter 17 may be considered an A. C. voltmeter inasmuch as the induction of the low tension winding lowers the voltage of the current flowing in the high tension windings, or more accurately, lowers the voltage across the breaker points 15, and it follows that this part of the test may be considered as the measurement of the voltage drop in the primary circuit of the tester when the low tension coil of the transformer under test is shorted. The second scale on the meter 17 is calibrated to read this drop in voltage indirectly in milliamperes and therefore any large drop in voltage, that is, a large reading on this reversed scale indicates that the transformer is of low efficiency and this taken in conjunction with the other parts of the test described above will determine whether any deficiency is the result of poor quality construction or due to actual defects such as shorted turns in either winding, leakage to ground or a gap in the high tension winding.

An important feature of the transformer test is the use of the condenser 19 in the primary circuit to by-pass sufficient current to operate the A. C. meter 17 satisfactorily when either D. C. or A. C. current is used.

The variable spark gap 27 is merely a safety unit to prevent straining and overloading of the high tension circuit as a result of any misuse of the tester.

One of the advantages of this tester will now be more clearly understood, namely, that since only the low amperage current produced by a low voltage current led into a unit corresponding exactly with an ordinary ignition coil, the which may be substituted for my transformer 10, is used to test similar low voltage transformers it is impossible to damage the tested units. Furthermore the introduction of the choke coil 8 into the primary circuit of the tester constitutes a particularly simple and inexpensive method of adapting a transformer tester for testing condensers as well, the effect of this extra inductance being to increase the effective E. M. F. of the countercurrent at the instant when the breaker points separate so that the condenser tests can be satisfactorily made as described and at the same time regulating the voltage of the current for operating the neon lamp and the rectifier, the peak voltage obtained approximating 115 volts.

Having described my invention and illustrated a preferred embodiment of the same, showing how the invention may be put into practice, I wish to point out that this disclosure is to be regarded as descriptive rather than limiting and that the following claims are to be interpreted as limiting my invention only so far as their specific terms require.

I claim:

1. An electrical measuring instrument comprising means to produce a periodically interrupted direct current in a highly inductive circuit, and means to connect in parallel with said means a condenser under test and an A. C. meter the latter two being in series, and means to periodically discharge said condenser so that the condenser under test itself converts the direct current into alternating current through said meter.

2. An instrument according to claim 1 and in which said first mentioned means is an ordinary induction coil with a make and break unit, one terminal of which is grounded to periodically discharge the said condenser and thus alternate the current through said meter.

3. An instrument according to claim 1 and in which said first mentioned means is an interrupter, one terminal of which is grounded to periodically discharge the said condenser and thus alternate the current through said meter.

4. An electrical measuring instrument comprising means to produce a periodically intermittent lagging current in a circuit, and means to connect in parallel with said means a condenser under test and a meter in series, and means to periodically discharge said condenser so that the condenser under test itself converts the direct current into alternating current through said meter.

5. An instrument according to claim 1 and in which a rectifier and a neon lamp are also in series with said meter.

6. An instrument according to claim 1 and in which said first mentioned means is a transformer with a make and break unit, one terminal of which is grounded to periodically discharge the said condenser and thus alternate the current through said meter.

7. An electrical measuring instrument comprising a transformer, a periodic interrupter in the primary circuit of said transformer, a meter and a condenser in series and shunting said interrupter, and means to connect a device to be tested in the secondary circuit of said transformer.

8. The combination with an instrument according to claim 7 of a second meter to measure a characteristic of a current induced by a current in said secondary in a circuit in said device, and means to connect this second meter in said circuit.

9. The combination with an instrument according to claim 7 of a second A. C. meter to measure the induced current in another circuit resulting from a flow of current in the said secondary, and means to connect this second meter in series in said circuit.

10. An instrument according to claim 7 and in which said device is an ignition coil transformer.

WILFRED DUPERRON.